United States Patent [19]

Hamilton et al.

[11] Patent Number: 5,102,319

[45] Date of Patent: Apr. 7, 1992

[54] HYDRAULIC SQUEEZE FOR TIRE CURING PRESS

[75] Inventors: Deane R. Hamilton, Louisville; Bernard F. Lesneski, Akron, both of Ohio

[73] Assignee: McNeil Akron, Akron, Ohio

[21] Appl. No.: 505,520

[22] Filed: Apr. 6, 1990

[51] Int. Cl.⁵ ............................... B29C 35/02
[52] U.S. Cl. ................................ 425/34.1; 425/40; 425/47
[58] Field of Search ............ 425/34.1, 28.1, 47, 425/34.1, 33, 40, 50, 41

[56] References Cited

U.S. PATENT DOCUMENTS

| | | | |
|---|---|---|---|
| 2,285,389 | 6/1942 | Bostwick | 425/35 |
| 3,222,724 | 12/1965 | Soderquist | 425/34.1 |
| 4,332,536 | 6/1982 | Singh et al. | 425/34.1 |
| 4,453,902 | 6/1984 | Imbert | 425/28.1 |
| 4,601,648 | 7/1986 | Amano et al. | 425/47 |
| 4,804,318 | 2/1989 | Fujieda et al. | 425/34.1 |
| 4,927,344 | 5/1990 | Amano et al. | 425/34.1 |

FOREIGN PATENT DOCUMENTS 2041304  2/1972  Fed. Rep. of Germany ..... 425/34.1

Primary Examiner—Willard Hoag
Attorney, Agent, or Firm—Oldham, Oldham & Wilson Co.

[57] ABSTRACT

A modification to a multiple cavity tire press places a plurality of hydraulic cylinders beneath the lower mold half and heat platen of each mold in the press. The size of the side links of the press is adjusted so that in normal operation, the side links only bring the upper and lower mold halves into close registration and hydraulic pressure applied to the lower mold halves through the plurality of hydraulic cylinders gives the squeeze to the press halves, as well as eliminating or minimizing the malocclusion of the mold halves known in the prior art due to deflection of the respected upper and lower portions of the mold by application of mechanical squeeze.

4 Claims, 3 Drawing Sheets

HYDRAULIC SQUEEZE FOR TIRE CURING PRESS

TECHNICAL FIELD

The present invention relates generally to an improvement for a press used to shape and cure pneumatic tires. More particularly, the present invention relates to an improvement particularly adapted for use with a multiple cavity tire curing press, even more particularly a dual cavity tire curing press of the sort used in curing tires for automobile and light-truck tires. Even more specifically, the present invention relates to a hydraulic system for more precisely registering the corresponding mold halves of a dual cavity tire curing press, so that the press will be capable of meeting stringent industry requirements for press performance while achieving savings in press cycle time, energy consumption and cost.

Still further, the present invention relates to a method of installing the above improvement into an existing tire press, specifically an existing multiple cavity tire press, while the press is still fixed in place in the factory where it is in use, rather than requiring the press to be removed, shipped to a refitting shop, modified, reshipped and reinstalled.

BACKGROUND ART

The method for manufacturing pneumatic tires for automobiles and other vehicles is well known in the art. The general method employed is to build up the tire on a cylinder or other sort of drum shaped base that is generally collapsible to release the product upon completion. The product is then unvulcanized and typically in a shape that is known as a "green tire" or a "band". In order to become a final product tire, the unvulcanized tire band is altered by a controlled deformation or expansion or radial distention from the cylindrical or semi-toroidal form to the full toroidal or tire shape that is commonly known. During the shaping process of a tire, the tire bead portions are moved toward each other to a pre-determined spacing, the tire tread portion is moved outwardly to define the maximum diameter, and the connecting wall portions are moved together from vertical to become substantially horizontal. Achieving this shape and structure, it is necessary to allow the various components in the tire band structure to stabilize, adjust or acclimate to their changing orientation in a very precisely controlled manner. Not only is it important to control temperatures and pressures on the outside of the tire band, it is also important to control pressure and temperature on the interior of the tire band.

The general method of curing a tire band or uncured tire is to place the tire band into the lower mold half of a press, where an inflatable rubber bag is inflated inside the tire band. This inflatable rubber bag is generally referred to as a bladder and is usually made from butyl rubber and mounted on a movable stem, commonly known as a center post, which is positioned coaxially to the lower mold half. Simultaneously, the tire is inflated into a "doughnut" shape and a mold is created by the registration or occlusion of upper and lower mold halves that encase the tire band. The tire band is then cured and shaped by heat that is applied through the mold, particularly through the heat platen, and by steam pressure into the bladder. Generally, excess rubber is allowed to escape through weep holes provided in the mold, and after a time, a completed tire is formed.

Before the mold is opened by reseparating the upper and lower mold halves, the bladder is deflated. Once the mold halves are separated, an unloading mechanism is used to strip the now-cured and shaped tire from the lower mold half, where the tire will rest. Once the tire is removed, a new uncured tire band can be positioned by the loading mechanism and the process begun anew. In a multiple cavity tire press, these steps are performed simultaneously for a plurality of tire bands.

The teaching of how to generally prepare tires in such a press can be learned well by just studying the patents of Leslie E. Soderquist. Some of these patents include U.S. Pat. Nos. 3,222,724, 3,260,782, 3,298,066, 3,336,630, 3,336,635, 3,336,636, 3,541,643, and 3,564,649, all of which are incorporated by reference herein as if fully recited.

As will be appreciated by studying the prior art, the curing of tires requires heavy mechanical components to counter the extreme forces produced in vulcanizing a tire. In a tire press, the respective upper and lower half molds that envelop the uncured tire and define the curing cavity must be pressed together under a squeeze load provided by a top beam and a bottom beam connected via a pair of side links or other means. If a single tire is to be formed in a press, the deflections of the top and bottom beam caused by this mechanical squeeze can be minimized, or at least made symmetrical. In fact, U.S. Pat. No. 4,453,902 to Imbert, discloses a method whereby a set of three triangulated side links can eliminate malocclusions of the upper and lower mold halves caused by beam deflections. The industry, however, clearly prefers multiple cavity tire presses for smaller tires, such as those used for automobile and light-truck service, and even if single cavity presses were to catch on for these tires, there still exists a large number of multiple cavity presses in which any opportunity to minimize malocclusion of the upper and lower mold halves due to beam deflection is still desirable.

SUMMARY OF THE INVENTION

Therefore, an object of the present invention is to provide a tire curing press which satisfies industry requirements for tire curing press performance and cost. It is clearly uneconomical to manufacture single cavity tire curing presses for curing automobile and light-truck tires.

Another object of the invention is to provide a tire curing press in which even stringent mold support deflection limitations may be technically and economically achieved to realize substantially uniform mold loading, especially in multiple cavity tire curing presses.

These and other objects of the present invention will become apparent as described in the detailed description incorporated below.

BRIEF DESCRIPTION OF THE DRAWINGS

For a better understanding of the invention, reference should be made to the accompanying drawings wherein.

Figure 1:
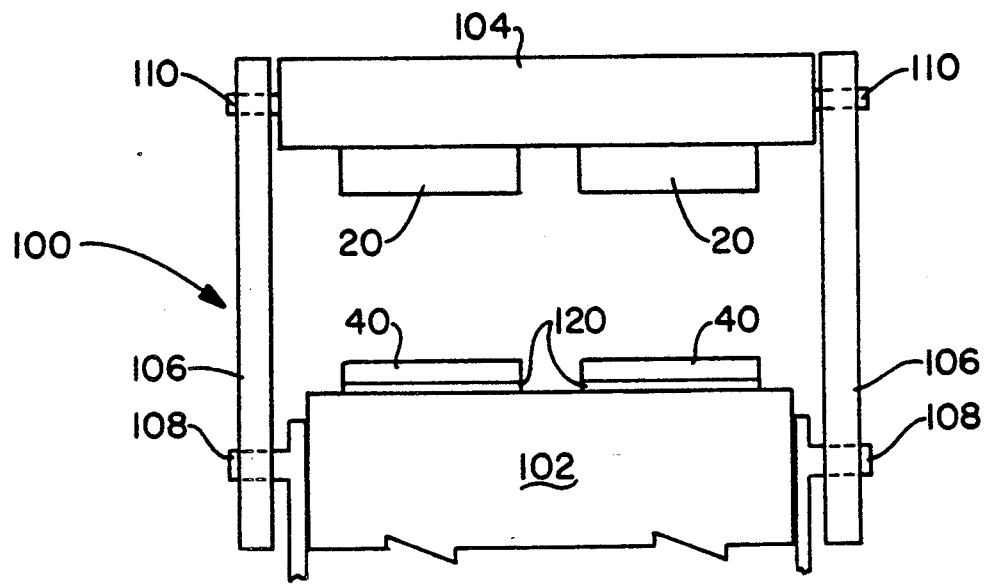
FIG. 1 shows a multiple cavity tire curing press known in the prior art, with its upper and lower mold halves disengaged.

ABSTRACT OF THE DRAWINGS 10 is the squeeze and compensation device of the present invention;
20 is the upper mold half of tire curing press 100;
22 is a malocclusion of upper mold half 20 with lower mold half 40;
24 is the base piece of the inventive device 10;
26 indicates the hydraulic cylinder casings of device 10;
28 indicates the hydraulic pistons of device 10;
30 indicates the fluid conduits of device 10;
32 is the central aperture in base piece 24;
34 is the means for connecting hydraulic piston 28 to heat platen 120;
40 is the lower mold half of tire curing press 100;
42 is the central aperture of lower mold half 40;
56 is a modified side link of the present; invention;
60 is the hydraulic pump;
62 is the hydraulic fluid;
64 is the hydraulic fluid supply reservoir;
66 is a check valve;
68 is a relief valve;
70 is a hydraulic fluid discharge reservoir;
72 is a pressure gauge;
100 is the multiple cavity tire curing press of the prior art;
102 is the base plate of tire curing press 100;
104 is the top crossbeam of tire curing press 100;
106 indicates side links of the tire curing press 100;
108 indicates the bull gears of tire curing press 100;
110 indicates the trunnions of tire curing press 100;
120 is the heat platen of tire curing press 100;
140 is an arrow indicating direction of mechanical squeeze force;

DETAILED DESCRIPTION OF THE INVENTION

FIG. 1 shows generally a front view of the multiple cavity tire curing press 100 to which the present invention applies. The main element of the press 100 consists of a plurality of pairs of corresponding upper mold halves 20 and lower mold halves 40 that are movable and separable relative to each other through the action of the press 100. In the specific illustration, a dual cavity press is shown, specific illustration, a dual cavity press is shown, that is, a press 100 wherein two pairs of mold halves, 20 and 40, are used and two tires are cured in each curing cycle. Although this type of press is illustrated due to its popularity, the present invention is by no means limited to a dual cavity press.

Lower mold halves 40 are placed atop a heating platen 120 that is affixed in a rigid but adjustable manner to a base plate 102. Upper mold halves 20 are positioned on the underside of a top crossbeam 104, but unlike the lower mold halves 40, the upper mold halves are rigidly and non-adjustably affixed. A side link 106 is located on each side of the press 100 and is used to connect the top crossbeam 104 having the upper mold halves 20 affixed thereto to the base plate 102 containing the lower mold halves 40. The lower end of each side link 106 is connected to the base plate 102 indirectly through a bull gear 108 which is driven by a motor (not shown). The upper end of the side link 106 is connected to top crossbeam 104 by a trunnion 110. Through the well known action of the side links as activated by the bull gear, the upper mold halves 20 can be brought into very close registration with the lower mold halves 40 by the action of the side links 106 in coaction with the bull gear. The respective mold halves 20 and 40 are positioned in the usual practice of the prior art so that the upper mold half 20 and the lower mold half 40 actually register or occlude with each other before the bull gear 108 has fully cycled the side links 106 downwardly. Further movement of the bull gear 108 through its cycle will, therefore, be met with resistance from the registered mold halves 20 and 40 and exert a "squeeze" force upon them, cause deflection of the top beam 104 and base plate 102, or both effects. The operation of this mechanism is well known and is described in the various Sodequist patents previously cited.

A general dual-cavity tire curing press 100 also includes mechanisms for the loading of uncured tire bands and the unloading of cured tires, although they are not shown in FIG. 1, as they are not relevant to the present invention's operation.

Figure 2A:
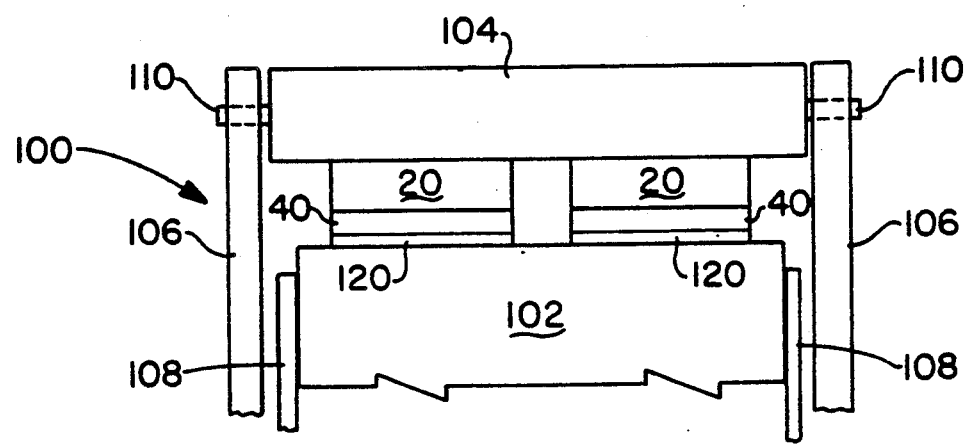
FIG. 2A shows the same multiple cavity tire curing press of the prior art with the top and lower mold halves registered.
Figure 2B:
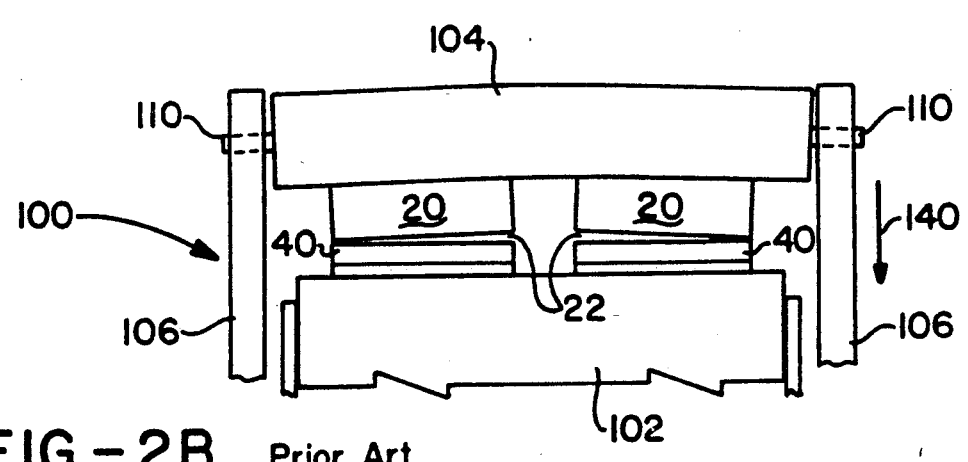
FIG. 2B illustrates the multiple cavity tire process of the prior art with the corresponding mold halves registered and a squeeze applied, showing beam deflection in an exaggerated manner.

Referring now to FIG. 2A, a general drawing is shown of a front view of the dual-cavity tire curing press 100. As the motor-driven bull gears 108 turn and cause the side links 106 to urge the top crossbeam 104 towards the base plate 102, upper mold halves 20 are brought into register with lower mold halves 40. As noted above, this registration occurs in the prior art presses at a point prior to the full action of the bull gear 108. Clearly, then, if a mechanical squeeze, that is, additional downward pressure on side link 106 as illustrated by arrow 140 in FIG. 2B is applied at the trunnion 110 on the top crossbeam 104 by the further action of the bull gear 108 to its full cycle point, this squeeze force cannot be brought to bear at the center portion of the top crossbeam 104. Because of this, the top crossbeam 104 and the base plate 102 will tend to deflect away from each other, as illustrated in an exaggerated fashion in FIG. 2B. Since the upper and lower mold halves 20 and 40, respectively, are rigidly affixed to the top crossbeam 104 and base plate 102, respectively, the beam deflection prevents the upper mold half 20 from coming into exact registration or occlusion with the lower mold half 40. When the heat and pressures that are required to properly vulcanize a tire are applied internal to the closed mold, this malocclusion of the mold halves will result in a product tire that is not symmetrical because of the beam deflection and resultant flashing of rubber out of the malocclusion, generally illustrated as 22.

Figure 3:
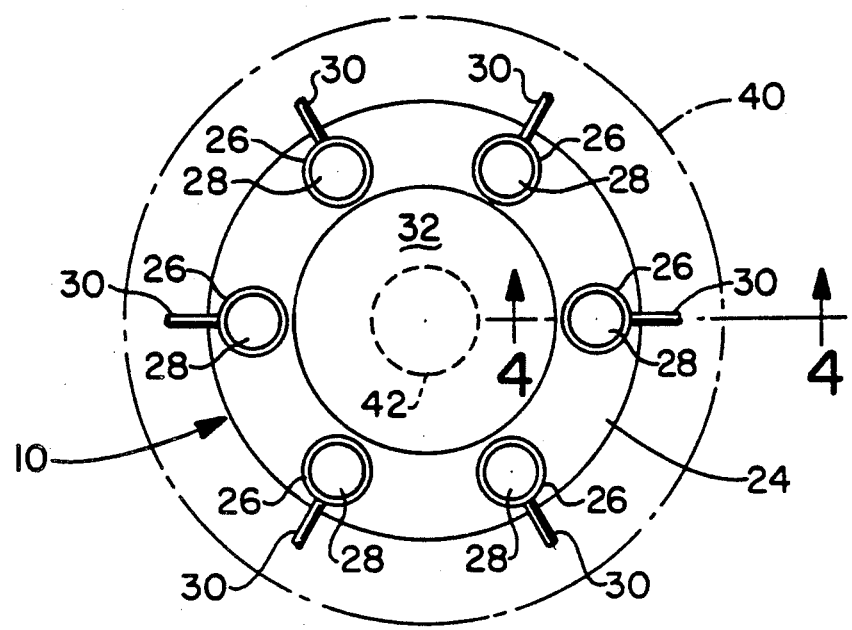
FIG. 3 is a top view of the hydraulic system of the present invention.

The solution of the present invention is presented in a top view in FIG. 3. The overall device 10, comprises a generally disk-shaped base piece 24 that can be rigidly yet adjustably affixed to base plate 102 upon which it sits. This rigid yet adjustable method of affixation would be well known from the prior art where the lower mold halves and the respective heating platen 120 are rigidly yet adjustably fixed to the base plate 102. In such a method of affixation, it is important to be able to adjust the exact position of the mold to within thousandths of an inch, due to the extreme precision required in producing the tires. Atop the base piece 24 are affixed a plurality of hydraulic cylinders 26 each such cylinder having a piston 28 slidingly positioned within it. In the embodiment illustrated in FIG. 3, there are six such hydraulic cylinders 26 and pistons 28 shown, and this is clearly the preferred number, although adjusting the exact number of cylinders and pistons is well within the skill of one of ordinary skill in this art.

It is also noted that a fluid conduit 30 is used to provide a communication between a hydraulic system (not shown in the figure), and each individual hydraulic cylinder 26. Further description of the hydraulic system is shown and described further below. A lower half tire mold 40 and corresponding heating platen 120 are shown by phantom lines as being positioned atop the inventive device 10 on FIG. 3. Because of the center post mechanism that is commonly employed with the lower half molds 40 in presses of the type this invention will be used with, the lower half mold 40 is illustrated as having a central hole 42 disposed therein and, to accommodate the center post mechanism, the base piece 24 is also shown as having a central hole 32.

Figure 4:
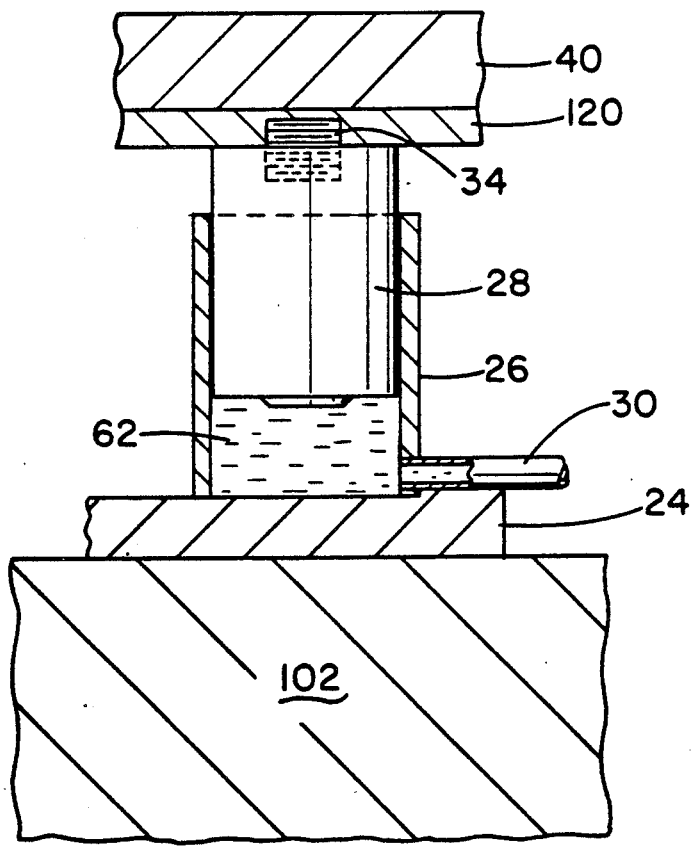
FIG. 4 is a cross section of one of the hydraulic cylinders of the present invention, as shown at line 4—4 of FIG. 3.

Attention is now directed to FIG. 4 where a side view cross section of a single hydraulic cylinder 26 and piston 28 of the inventive device 10 are disclosed. As described above, the base piece 24 and essentially perpendicular to the upper surface thereof is rigidly yet adjustably affixed to the base plate 102, by means well known in the art. Rigidly affixed atop the base piece 24 is a hydraulic cylinder 26 having a fluid conduit 30 entering it near the lower portion of the hydraulic cylinder 26. A piston 28 is slidingly engaged in the hydraulic cylinder 26 so that fluid 62 entering through conduit 30 can be used to force the hydraulic piston 28 upwardly, i.e. toward the top of FIG. 4 and toward the heating platen 120. A threaded member 34 is used to rigidly affix piston 28 to heating platen 120, which is in turn rigidly affixed to lower mold half 40.

Figure 5:
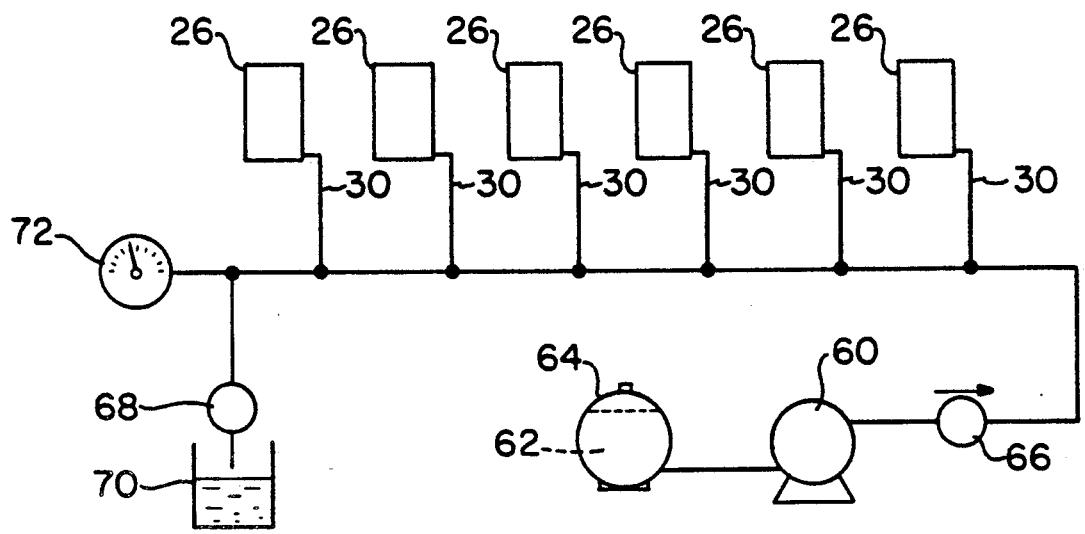
FIG. 5 is a schematic of the hydraulic system of the present invention.

FIG. 5 discloses the hydraulic system utilized in this method. A pump, generally indicated as 60, pumps hydraulic fluid 62 from a source vessel 64 into a plurality of conduits 30 that are connected in series to each individual hydraulic cylinder 26. Between the pump 60 and each individual conduit 30 is a check valve 66 which is used to prevent damage to the pump 60. Pressure relief valve 68, a discharge vessel 70 for catching hydraulic fluid and pressure gauge 72 are also provided to prevent over-pressurization of the system.

Figure 6:
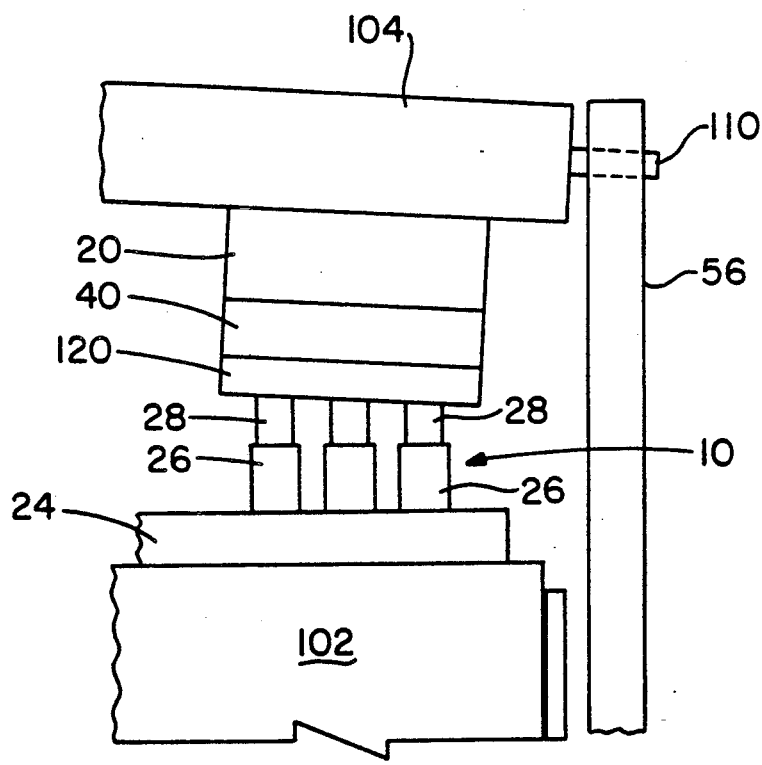
FIG. 6 is a side view of a modified multiple cavity tire press of the present invention, illustrating correction beam deflection by the hydraulic cylinders.

The operation of the hydraulic compensation device 10 of the present invention is illustrated in FIG. 6. In this figure, the press 100 has been modified somewhat in installing the device 10. Particularly, the side links, now indicated as 56, have been adjusted so that the registration of lower mold half 40 with upper mold half 20 does not occur until the bull gear 108 is almost completely at the end of its cycle, so that the respective mold halves have just come into a light contact or "kissing" registration, similar to the sort of registration illustrated in FIG. 2A. Also, the interposition of the inventive device 10 between base plate 102 and lower mold half 40 and heat platen 120 will result in a need to adjust the side links 56 to properly position the corresponding mold halves 20 and 40.

Rather than providing the squeeze in the manner illustrated in FIG. 2B, that is, by applying additional pressure through the side links 56, the squeeze is instead applied by pressurizing the plurality of cylinders 26 by pressurizing the individual hydraulic cylinders 26 with hydraulic fluid 62 flowing into the individual cylinders 26 through fluid conduits 30. Due to the differential ability of the various cylinders 26 to act through the connecting means 34 and against the heat platen 120 and the lower mold half 40 at the various points of connection, the amount of malocclusion 22 illustrated in FIG. 2B is minimized or almost totally eliminated, as is the amount of deflection of the top crossbeam 104 and the base plate 102. In this manner a more exact registration of the respective mold halves 20 and 40 is achieved and the tire produced is more exactly conforming to the stringent requirements of the industry.

Referring back briefly to FIG. 3, it is noted that the best position for placing the hydraulic cylinders 26 around the circumference of the base piece 24 is to locate the cylinders 26 so that the center point of the cylinder 26 acts directly upon the radial distance of the lower mold half 40 which corresponds to crown portion of the tire that is being formed in the mold.

Such a device 10 as disclosed in this specification may be installed in the multiple cavity press 100 known in the prior art by removing the top crossbeam 104 from the side links 106, removing the side links 106 of the press 100, replacing the heat platen 120 and lower mold half 40 from the base plate 102, interposing the inventive device 10 upon the base plate 102 in a rigidly fixed, although adjustable manner, affixing the heat platen 120 and lower mold half 40 to the inventive device 10 by connecting means 34, attaching modified side links 56 to the press 100 by attachment to the bull gear 108, and reattaching the top crossbeam 104 to the side links through trunnions 110. The modified side links should be sized so as to permit the corresponding upper and lower mold halves 20 and 40 to only lightly close or register at the point when the bull gear 108 reaches the bottom of its cycle. In this way, the "squeeze" required to properly seal the mold halves 20 and 40 for curing must be provided by action of the plurality of hydraulic cylinders 26 and the accompanying hydraulic system disclosed herein and illustrated in FIG. 5.

While in accordance with the statutes, only the best known embodiments of the invention have been illustrated and described in detail, it is to be particularly understood that the invention is not limited thereto or thereby, but that the inventive scope is defined in the appended claims.

We claim:

1. In a multiple cavity press for shaping and curing pneumatic tires, said press comprising a plurality of upper mold halves rigidly affixed to a top crossbeam and a corresponding plurality of lower mold halves, each said lower mold half having a heating platen integral to its lower surface, said heating platens rigidly but adjustably affixed to a base plate, said top crossbeam and base plate connected to each other through a pair of side links, one such side link on each side of the press, said corresponding upper and lower mold halves being registerable to each other by relative movement of the side links, wherein the improvement comprises, for each lower mold half and its corresponding heat platen;

a plurality of hydraulic cylinder casings;

a corresponding plurality of hydraulic pistons, one such piston disposed in each hydraulic cylinder casing;

a pressurizing means for causing a fluid to flow into the lower portion of each cylinder casing and urge the piston disposed therein outwardly from the casing;

a conduit means for communicating each said hydraulic casing with the pressurizing means;

means for rigidly connecting the top surface of each said hydraulic piston to the lower surface of said heat platen;

a plate for disposing said plurality of hydraulic cylinder casings substantially perpendicular to said plate; and means for rigidly but adjustably affixing said plate to said base plate between said base plate and said heat platen;

such that when an uncured tire is placed in each lower mold half and the upper and lower mold halves are registered by movement of the top crossbeam, the upper and lower mold halves are squeezed together by action of the pressurizing means, and the variable ability of each cylinder to move outwardly of the cylinder and to bias the lower mold half against the upper mold half will minimize any malocclusion of the upper mold half and lower mold half caused by deflection of the top crossbeam, the base plate, or both.

2. The apparatus of claim 1 wherein the number of hydraulic cylinder casings is six.

3. The apparatus of claim 1 wherein the cylindrical casings are connected in parallel to the pressurizing means.

4. The apparatus of claim 1 wherein the hydraulic cylinder casings are positioned generally equidistant from each other and each is positioned radially adjacent the tread portion of the mold.

* * * * *